UNITED STATES PATENT OFFICE.

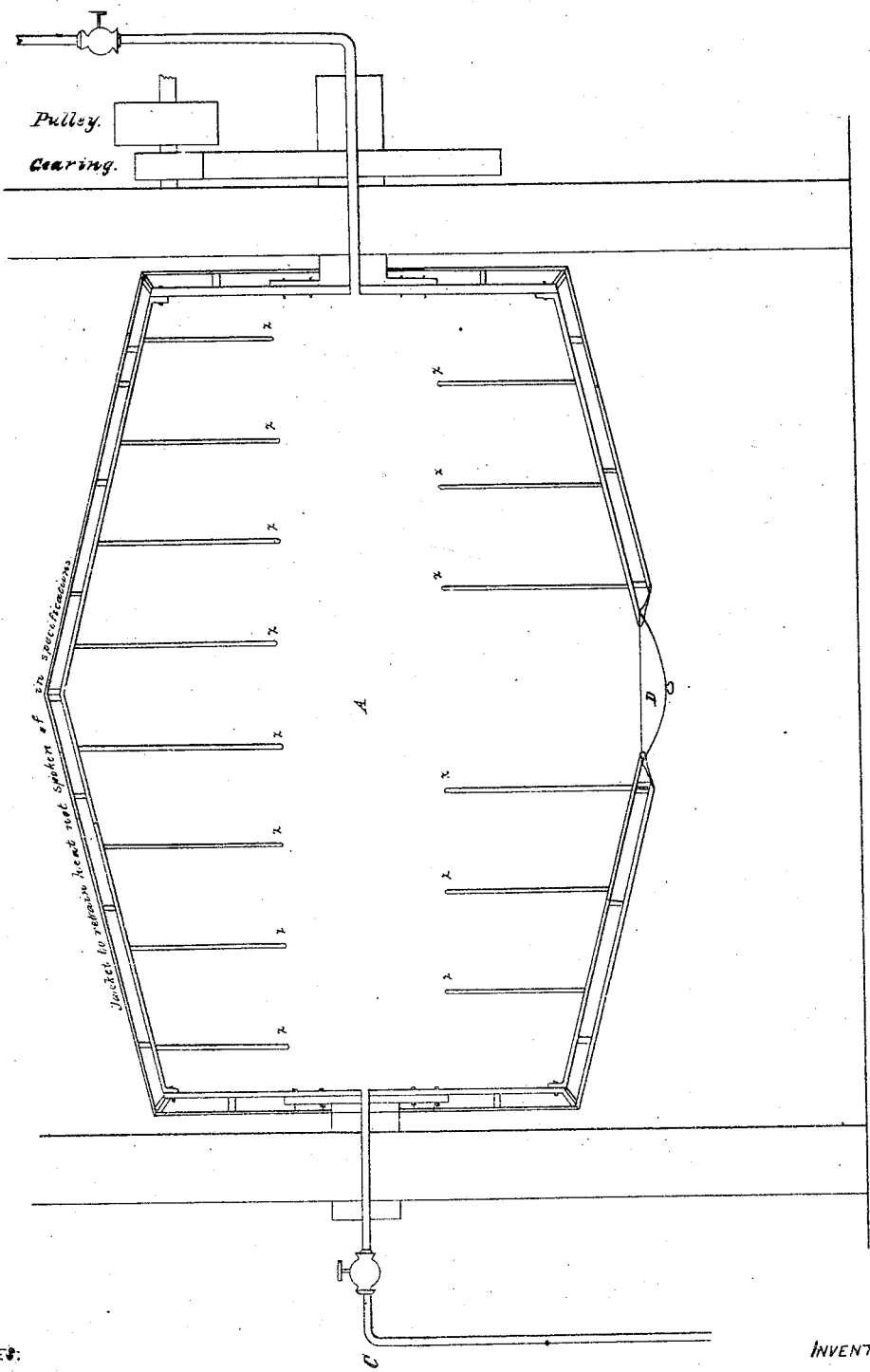

GEORGE F. WILSON, OF EAST PROVIDENCE, RHODE ISLAND.

IMPROVEMENT IN THE MANUFACTURE OF PHOSPHATIC FERTILIZERS.

Specification forming part of Letters Patent No. 75,325, dated March 10, 1868.

*To all whom it may concern:*

Be it known that I, GEORGE F. WILSON, of the town of East Providence, county of Providence, and State of Rhode Island, have invented a new and Improved Method of Making an Improved Fertilizer for Agricultural Purposes; and I do declare that the following is a full and exact description thereof, reference being had to the accompanying drawings, and to the letters of reference marked thereon.

The nature of my invention consists in the application of the law of double decomposition, under favorable circumstances, for the production of an improved agricultural fertilizer from bones, bone-ash, bone-coal, and spent bone-black of the sugar and oil refineries, and what is known among chemical manufacturers as "niter-cake" and "salt-cake"—refuse materials produced in the manufacture of nitric acid and muriatic acid and sulphuric acid.

In order that the nature of my invention may be clearly understood, it is necessary that I should explain the difference in the properties of niter and salt cake under different circumstances. The manner in which these bodies are produced is well known to those skilled in the art of making nitric and muriatic acid and other chemicals. When, as is usually the case, they are allowed to cool in the apparatus in which they are produced, and after cooling in any case they both become hard and solid, may be readily handled with the bare hand, are broken with difficulty, act very slowly on most other bodies with which they are brought in contact, and are very slowly soluble in even large quantities of hot or cold water. They usually contain a greater or less quantity of nitric or muriatic acid, according as they are produced from either nitrate of soda or potash and chloride of sodium. The "second equivalents," so called, of both the nitric and muriatic acid are driven over only by increased heat, which is destructive to the apparatus, and is also liable to carry over portions of sulphuric acid, to the injury of both the nitric acid and the muriatic acid sought to be produced. On the contrary both these salt-cakes, when hot, and just after the process of distillation for nitric and muriatic acid has been completed, are in a viscid pasty condition, cannot be handled by the bare hand; they attack nearly all substances with which they are brought in contact with great energy, and are readily soluble in hot or cold water.

In my early experiments with these bodies, which were begun a long time ago, I tried grinding these salt-cakes and bones, bone-ash, and bone-coal together, and subsequently treating them with hot and with cold water, hoping thereby to effect in time their double decomposition, and to obtain a compound of sulphate of lime and phosphate of soda. I found the plan troublesome and expensive, and that it was a long time before even a partial decomposition took place.

I tried also the solution of the cake in water, and the boiling of the bone phosphate of lime, as above said, therein with agitation; but the quantity of water required to effect the solution, and the imperfect nature of the result, was not satisfactory to me.

I also tried, with somewhat better results, the use of high pressure and of superheated steam upon the mixture of the aforesaid bodies; but the method which I prefer to either of the aforementioned is the following:

Convenient to my nitric-acid retorts, as well as to the muriatic-acid retorts, I place a revolving iron cylinder, A, having in one of its axles an injection steam-pipe, B, and in the other axle an ejection-pipe, C, both provided with valves and suitable steam-tight packing-joints. The cylinder is provided with rods of iron, secured to its inner circumference, and pointing toward the center, as shown at $x\,x\,x\,x$, &c. It is also provided with a man-hole plate, D, and with a system of gears, suitably attached, so as to communicate a revolving motion to it. I partially fill this cylinder with bones, (which have been boiled, I prefer,) bone-ash, bone-coal, or spent black, or with several or all of them mixed together, and a quantity of hot water or cold water. Into this cylinder I put the hot viscid niter or salt-cake, above described, or both, as soon as it can be got out of the retorts, and close up the man-hole plate, set the cylinder in motion, and apply the steam under high pressure or superheat from the injection-pipe. In a very short time I find the phosphate of lime decomposed as well as the salt-cake, giving, principally, sulphate of lime in minute divisions, and phosphate of soda, with some muriate of lime or nitrate of lime, or both, according to the quantity of the nitric and muriatic acid left in the salt-cake and in the cylinder.

In carrying on the manufacture of this fertilizer, in connection with the manufacture of nitric and muriatic acids, as stated above, I have found it undesirable to attempt to drive off or distil over any considerable portion of the second equivalents of nitric or muriatic acid; because I save all danger of damage to my apparatus from the excessive heat necessary to accomplish this end; because I am able to secure a product of nitric or muriatic acid free from the least trace of sulphuric acid; because the presence of either or both of these acids in the salt-cake in the condition in which it is applied to the aforesaid bone phosphates (and perhaps mineral phosphates) aids greatly in securing their decomposition; and because the full value of these acids left in the salt-cakes is retained in the fertilizer, and adds greatly to its value.

What I have said in the above portion of my specification concerning salt-cakes relates, principally, to these products when obtained from the manufacture of nitric and muriatic acids. It is evident that the statements are equally true in regard to the niter-cake produced, or which may be produced, in the manufacture of sulphuric acid.

What I claim as my invention, and desire to secure by Letters Patent, is—

1. The method of decomposing the said bone phosphates by the said salt-cake, substantially as above described.

2. The fertilizing product, produced substantially as above described.

3. The revolving cylinder, substantially as above described, when used in connection with the manufacture of either nitric, muriatic, or sulphuric acid, or two or more of them, for the purpose of producing the aforesaid fertilizer or compound, substantially as above described.

4. The manufacture of the aforesaid fertilizer, in connection with either, any, or all of the aforesaid acids by the use of the resulting residuary salt cake or cakes, substantially as and for the purpose above described.

GEO. F. WILSON.

Witnesses:
ALBERT H. CAMPBELL,
ELLERY H. WILSON.